US010354087B2

United States Patent
Keber et al.

(10) Patent No.: US 10,354,087 B2
(45) Date of Patent: Jul. 16, 2019

(54) REMOVABLE DATA STORAGE MEDIUM, MEDICAL DEVICE AND METHOD FOR OPERATING A REMOVABLE DATA STORAGE MEDIUM

(71) Applicant: OLYMPUS WINTER & IBE GMBH, Hamburg (DE)

(72) Inventors: Florian Keber, Hamburg (DE); Jan Wilbert Schmidt-Klentzer, Hamburg (DE)

(73) Assignee: OLYMPUS WINTER & IBE GMBH, Hamburg (DE)

( * ) Notice: Subject to any disclaimer, the term of this patent is extended or adjusted under 35 U.S.C. 154(b) by 150 days.

(21) Appl. No.: 15/209,963

(22) Filed: Jul. 14, 2016

(65) Prior Publication Data

US 2016/0321467 A1    Nov. 3, 2016

Related U.S. Application Data

(63) Continuation of application No. PCT/EP2015/000009, filed on Jan. 6, 2015.

(30) Foreign Application Priority Data

Jan. 14, 2014    (DE) .......................... 10 2014 200 533

(51) Int. Cl.
*G06F 21/62*    (2013.01)
*G06F 21/42*    (2013.01)
(Continued)

(52) U.S. Cl.
CPC .......... *G06F 21/6245* (2013.01); *G06F 21/42* (2013.01); *G06F 21/43* (2013.01);
(Continued)

(58) Field of Classification Search
None
See application file for complete search history.

(56) References Cited

U.S. PATENT DOCUMENTS 5,720,293 A * 2/1998 Quinn .................... A61B 5/028
600/505
5,742,718 A * 4/1998 Harman ................ A61B 18/24
385/53
(Continued)

FOREIGN PATENT DOCUMENTS

CN     101300585 A    11/2005
CN       2904110 Y     5/2007
(Continued)

OTHER PUBLICATIONS

MultiMediaCard. In: Wikipedia, The Free Encyclopedia. Status: Dec. 27, 2013. URL:https://en.wikipedia.org/wiki/MultiMediaCard?oldid=587898449 [downloaded on Jan. 23, 2017].
(Continued)

*Primary Examiner* — Saleh Najjar
*Assistant Examiner* — Michael W Chao
(74) *Attorney, Agent, or Firm* — Scully, Scott, Murphy & Presser, PC (57) ABSTRACT

A removable data storage medium including a serial interface; a non-volatile storage medium; a memory controller controlling data transmission between the serial interface and the non-volatile storage medium, a receiving unit; and a write protection unit; wherein the receiving unit is configured to receive a device identification feature from a medical device that can be connected to the removable data storage medium; and the write protection unit is configured to compare the device identification feature with a predetermined internal criterion, and, if the device identification feature complies with the predetermined internal criterion, permits read and write access from the medical device to the
(Continued)

non-volatile storage medium and, if the device identification feature does not comply with the predetermined internal criterion, limits access of the medical device to the non-volatile storage medium to read access.

6 Claims, 4 Drawing Sheets

(51) Int. Cl.
G06F 21/43 (2013.01)
G06F 21/44 (2013.01)
G06F 21/73 (2013.01)

(52) U.S. Cl.
CPC ......... *G06F 21/44* (2013.01); *G06F 21/6218* (2013.01); *G06F 21/73* (2013.01); *G06F 21/62* (2013.01)

(56) References Cited

U.S. PATENT DOCUMENTS

| | | | |
|---|---|---|---|
| 6,606,707 B1* | 8/2003 | Hirota | G06F 21/10 713/172 |
| 6,820,160 B1* | 11/2004 | Allman | G06F 13/4072 710/305 |
| 6,968,459 B1 | 11/2005 | Morgan et al. | |
| 7,152,801 B2* | 12/2006 | Cuellar | G06K 19/072 235/492 |
| 7,749,028 B2* | 7/2010 | Iranpour Feridani | G02B 6/3873 439/660 |
| 7,873,837 B1* | 1/2011 | Lee | G06F 12/1416 713/179 |
| 7,956,618 B2* | 6/2011 | Lundquist | H01R 13/7039 324/538 |
| 8,180,931 B2* | 5/2012 | Lee | G06F 3/0613 710/14 |
| 8,200,320 B2* | 6/2012 | Kovacs | A61B 5/0205 600/513 |
| 8,255,026 B1* | 8/2012 | Al-Ali | A61B 5/14551 600/310 |
| 8,335,920 B2* | 12/2012 | Jevans | G06F 21/41 710/1 |
| 8,560,865 B2* | 10/2013 | Goel | G06F 11/1456 710/20 |
| 2004/0235842 A1 | 11/2004 | Flohr et al. | |
| 2006/0095699 A1 | 5/2006 | Kobayashi et al. | |
| 2006/0259785 A1* | 11/2006 | Thibadeau | G06F 21/80 713/193 |
| 2006/0294272 A1* | 12/2006 | Chou | G06K 19/07732 710/62 |
| 2007/0073937 A1* | 3/2007 | Feinberg | G06F 9/445 710/62 |
| 2007/0083939 A1* | 4/2007 | Fruhauf | G06F 21/78 726/34 |
| 2007/0120643 A1* | 5/2007 | Lee | G06F 21/35 340/5.61 |
| 2008/0022415 A1* | 1/2008 | Kuo | G06F 21/80 726/31 |
| 2008/0094926 A1* | 4/2008 | Neel | G16H 10/65 365/201 |
| 2008/0140572 A1* | 6/2008 | Jackson | G06F 21/6245 705/51 |
| 2008/0155257 A1* | 6/2008 | Werner | H04L 9/0844 713/168 |
| 2008/0162784 A1* | 7/2008 | Obereiner | G06F 12/1483 711/103 |
| 2008/0215881 A1 | 9/2008 | Cai et al. | |
| 2008/0320200 A1* | 12/2008 | Pederson | H04B 10/1143 710/305 |
| 2008/0320587 A1* | 12/2008 | Vauclair | H04L 41/28 726/17 |
| 2009/0119514 A1 | 5/2009 | Sawada | |
| 2009/0144456 A1* | 6/2009 | Gelf | G06F 13/4022 710/8 |
| 2009/0216922 A1* | 8/2009 | Park | G06F 13/385 710/63 |
| 2009/0271585 A1 | 10/2009 | Kuo et al. | |
| 2010/0042846 A1* | 2/2010 | Trotter | G06F 21/31 713/182 |
| 2010/0083368 A1* | 4/2010 | Kristensen | G06F 21/34 726/18 |
| 2010/0174913 A1* | 7/2010 | Johnson | G06F 21/34 713/186 |
| 2010/0199108 A1* | 8/2010 | Abzarian | G06F 21/805 713/193 |
| 2010/0293374 A1 | 11/2010 | Bushby | |
| 2011/0016253 A1* | 1/2011 | Kakish | G06F 13/385 710/313 |
| 2011/0121049 A1* | 5/2011 | Malinouskas | A61B 17/07207 227/175.1 |
| 2011/0218546 A1 | 9/2011 | De la Fuente Klein et al. | |
| 2011/0243568 A1* | 10/2011 | Lai | G06F 13/385 398/138 |
| 2011/0289178 A1* | 11/2011 | Ittah | G06F 21/79 709/213 |
| 2012/0057867 A1* | 3/2012 | Lin | G06K 19/0728 398/43 |
| 2012/0184120 A1* | 7/2012 | Basta | A61B 5/746 439/213 |
| 2012/0190332 A1* | 7/2012 | Charles | G06Q 20/3229 455/410 |
| 2012/0254967 A1 | 10/2012 | Braun | |
| 2013/0019109 A1* | 1/2013 | Kang | G06F 21/10 713/193 |
| 2013/0042102 A1* | 2/2013 | Ueda | H04N 21/835 713/156 |
| 2013/0104220 A1* | 4/2013 | Lee | G06F 21/34 726/9 |
| 2013/0203345 A1* | 8/2013 | Fisher | H04B 11/00 455/41.1 |
| 2014/0337920 A1* | 11/2014 | Giobbi | G06F 21/44 726/3 |
| 2015/0019875 A1* | 1/2015 | Barbiero | G06F 21/602 713/189 |
| 2016/0203311 A1* | 7/2016 | Kaines | G06F 21/44 726/19 |

FOREIGN PATENT DOCUMENTS

| | | |
|---|---|---|
| CN | 101566970 A | 10/2009 |
| CN | 103037370 A | 4/2013 |
| CN | 103139366 A | 6/2013 |
| JP | 2006-011948 A | 1/2006 |
| JP | 2006-153828 A | 6/2006 |
| JP | 2007-502848 A | 2/2007 |
| JP | 2007-282045 A | 10/2007 |
| JP | 2008-200949 A | 9/2008 |
| JP | 2012-212396 A | 11/2012 |
| WO | 2011/072826 A1 | 6/2011 |

OTHER PUBLICATIONS

International Search Report dated Mar. 18, 2015 issued in PCT/EP2015/000009.
Japanese Office Action dated Aug. 28, 2018 in Japanese Patent Application No. 2016-546781.

\* cited by examiner

REMOVABLE DATA STORAGE MEDIUM, MEDICAL DEVICE AND METHOD FOR OPERATING A REMOVABLE DATA STORAGE MEDIUM

CROSS-REFERENCE TO RELATED APPLICATION

The present application is a continuation of PCT/EP2015/000009 filed on Jan. 6, 2015, which is based upon and claims the benefit to DE 10 2014 200 533.7 filed on Jan. 14, 2014, the entire contents of each of which are incorporated herein by reference.

BACKGROUND

Field

The present application relates to a removable data storage medium having a serial interface, a non-volatile storage medium and a memory controller controlling the data transmission between the serial interface and the non-volatile storage medium. More particularly, the present application relates to a medical device, comprising a device identification feature and a serial interface for exchanging data with a removable data storage medium. The present application further relates to a method for operating a removable data storage medium having a serial interface, a non-volatile storage medium and a memory controller controlling the data transmission between the serial interface and the non-volatile storage medium. Finally, the present application relates to a medical system, comprising a removable data storage medium and a medical device.

Prior Art

Removable storage media, for example USB memory sticks, are generally known.

In a medical environment, information is exchanged between individual medical devices, but also between medical devices and otherwise used computers, with the help of removable data storage media.

However, conventional removable data storage media do not always reach the desired requirements for quality, data transmission speed and data security in a medical environment. The consequences are incomplete data transmission or data loss.

Moreover, there is a risk that malware is transmitted from the freely accessible computer to the medical devices via a removable data storage medium, which is used both on medical devices as well as on freely accessible computers.

SUMMARY

It is an object to provide a removable data storage medium, the data communication with medical devices of which is improved with respect to data security. It is also an object to provide a medical device, the data communication with removable data storage media of which is improved with respect to data security. Moreover, it is an object to provide a method for operating a removable data storage medium, which enables secure data communication between the removable data storage medium and medical devices. Finally, it is an object to provide a medical system, in which data communication takes place with enhanced data security.

Such objects are solved by a removable data storage medium having a serial interface, a non-volatile storage medium and a memory controller controlling the data transmission between the serial interface and the non-volatile storage medium, wherein the removable data storage medium is further developed in that a receiving unit and a write protection unit, which can be provided in the memory controller, being present, wherein the receiving unit is configured to receive a device identification feature from a medical device that can be connected to the removable data storage medium, and the write protection unit is configured to compare the device identification feature with a predetermined internal criterion, and, if the device identification feature complies with this criterion, to permit read and write access to the non-volatile storage medium and, if the device identification feature does not comply with the criterion, to limit access to the non-volatile storage medium to read access.

The removable data storage medium can be a mass storage, the non-volatile storage medium of which is a flash storage, for example an EEPROM.

The removable data storage medium can be configured in a case when it is not in the position to determine a device identification feature to treat this case such that the device identification feature does not meet the criterion.

With such removable data storage medium, a data export from a medical device to any computer system is possible. However, a data import and export is only possible between such medical devices, which were authenticated based on their device identification feature by the removed data storage medium for this type of data access. In other words, this means that the device identification features of the concerned medical devices must have respectively complied with the predetermined internal criterion of the removable data storage medium before they receive full access to the removable data storage medium. The removable data storage medium thus classifies the medical devices based on their device identification features as trustworthy and permits an unhindered data exchange between the thusly qualified appliances.

It is thus possible that data is exported from a medical device to any computer system in order to render or further process them there. Conversely, data from this computer system, which was not identified as a qualified medical system, is not transmitted to medical devices. The removable data storage medium only gives the non-qualified computer system read access and no read and write access to the non-volatile storage medium. Thus, the non-qualified computer system is not able to transmit data to the medical devices, which increases the data security in such an environment. Neither the data saved on the removable data storage medium nor the data present on the medical device can be infected with malware.

For example, a predetermined code saved in the medical device, a serial number, a certain hardware equipment, information regarding the manufacturer of the medical device, for example an open or encrypted manufacturer identification number or a manufacturer code, a type or version number of the device, of the hardware and/or software equipment etc. can be used as the device identification feature.

It is possible to form the device identification feature based on individual or several of the named data, if applicable based on a specific determined combination of different data. In other words, the device identification feature can be made up of several characteristics. The device identification feature serves to identify the medical device. It is thereby less important to uniquely identify a medical device as such than to assign it to a class of trustworthy medical devices, between which an unrestricted data exchange should be possible.

For this purpose, the device identification feature is compared with a predetermined criterion present on the removable data storage medium. A unique comparison can be performed so that the removable data storage medium only communicates for example with a certain device with full access (read and write mode). However, the removable data storage medium can identify a group of medical devices based on the comparison with the predetermined criterion, wherein each device in this group is granted full access. For example, devices as of a certain serial number, as of a certain year of manufacture or devices from a certain manufacturer can each be granted full access, i.e. read and write access, to the removable data storage medium.

According to one embodiment, the removable data storage medium can be further developed in that the receiving unit is configured to receive the device identification feature via a wireless data link. For example, the receiving unit can comprise an RFID transponder. According to further embodiments, the receiving unit can comprise a Bluetooth and/or a NFC (New Field Communication) transponder.

The identification of the medical device via a wireless data link is advantageous because this process can take place before the data storage medium is connected to the concerned medical device via the serial interface. Thus, the subsequent connection establishment between the removable data storage medium and the medical device does not result in a further delay. Moreover, it is possible that the removable data storage medium outputs, for example, an optical or acoustic signal, which notifies the user that a data link with the concerned appliance is possible with full access or in read mode only. The user is thus already able to decide how to proceed before establishing the actual data link.

In a further embodiment, the removable data storage medium can be enhanced in that the receiving unit is configured to receive data via an optical data link, such as a photodiode.

According to a further embodiment, the removable data storage medium can be advantageously enhanced in that the receiving unit is mechanically encoded and configured to interact with a complementary mechanically encoded transmitting unit on the medical device that can be connected to the removable data storage medium.

The used receiving unit, i.e. for example the photodiode or the mechanically encoded receiving unit, can be provided in direct proximity of the serial interface on the removable storage unit. It is thus possible that the receiving unit interacts with the corresponding transmitting unit of the medical device at the moment when the removable data storage medium is also connected to the serial interface of the medical device.

The requirements for authentication and subsequent data transmission can be advantageously established with a handle, which simplifies the handling of the removable data storage medium.

According to a further embodiment, the removable data storage medium can be configured as a USB memory stick, wherein a USB port is provided as the serial interface. Such a removable data storage medium can have a housing, in which the non-volatile storage medium, the memory controller, the write protection unit and the receiving unit are all arranged together. Such a removable data storage medium is compact and robust and thus suitable for use in a medical environment.

An object is also solved by a medical device, comprising a device identification feature and a serial interface for exchanging data with a removable data storage medium, wherein the medical device is enhanced in that it comprises a transmitting unit, which is configured to transmit the device identification feature to the removable data storage medium.

The medical device is advantageously configured for secure data communication with a removable data storage medium according to one or more of the named embodiments. The aspects mentioned with respect to the removable data storage medium thus also apply analogously to the medical device.

According to a further embodiment, the medical device can be enhanced in that the transmitting unit is configured to send the device identification feature to the removable data storage medium via a wireless data link. The transmitting unit can comprise an RFID tag, in which the device identification feature is stored in the form of a code identifying the medical device.

In one embodiment, the medical device is configured so that the transmitting unit comprises a light emitter, such as, an IR light-emitting diode. It is also possible to advantageously further develop the medical device such that the transmitting unit is mechanically encoded and configured to interact with a mechanically encoded receiving unit that can be connected to the medical device.

The same or similar advantages as those already mentioned with respect to the removable data storage medium also apply in the same or a similar way to the medical device according to one or more of the named embodiments. These are not repeated in order to prevent the item from being reintroduced.

An object according is also solved by a method for operating a removable data storage medium having a serial interface, a non-volatile storage medium and a memory controller controlling the data transmission between the serial interface and the non-volatile storage medium, wherein the method can be enhanced in that a write protection unit and a receiving unit are provided and the method comprises the following steps:

connecting the serial interface of the removable data storage medium having a serial interface of a medical device, receiving a device identification feature from the medical device on the receiving unit, comparing the device identification feature with a predetermined internal reference criterion, and setting read and write access to the non-volatile storage medium of the removable data storage medium if the device identification feature complies with the criterion and limit of access to the non-volatile storage medium to read access if the device identification feature does not comply with the criterion.

For the method, it does not matter which of the two steps "connecting the serial interface" and "receiving the device identification feature" is performed first. It is also possible that the two steps take place more or less simultaneously. If the removable data storage medium is not able to identify a device identification feature, then it is treated like a case when the device identification feature does not comply with the criterion.

The method can be advantageously further developed in that the device identification feature is received via a wireless data link, wherein the device identification feature is received by an RFID transponder and/or by a receiving unit, such as a photodiode, configured for an optical data link.

According to a further embodiment, the method can be enhanced in that the device identification feature is received at a mechanically encoded receiving unit by mechanical interaction with a complementary mechanically encoded transmitting unit.

The same or similar advantages as those already mentioned in terms of the removable data storage medium also apply to the method for operating a removable data storage medium.

Finally, an object is solved by a medical system, comprising a removable data storage medium according to one or more embodiments and a medical device according to one or more of the named embodiments.

In the medical system, the data communication with the help of removable data storage media is considerably securer than in conventional systems. However, the restrictions for data transmission are low since, for example, data from the medical devices can be exported to further computer systems in an unrestricted or unlimited manner. Otherwise, same or similar advantages as those already mentioned in terms of the removable data storage medium also apply to the medical system.

Further features will become apparent from the description of embodiments together with the claims and the included drawings. Embodiments can fulfill individual features or a combination of several features.

BRIEF DESCRIPTION OF THE DRAWINGS

The embodiments will be described below without restricting the general inventive idea using exemplary embodiments with reference to the drawings, and for any details which are not explained further in the text express reference is made to the drawings. They show in.

In the drawings, same or similar elements and/or parts are provided with the same reference numbers in order to prevent the item from needing to be reintroduced.

DETAILED DESCRIPTION

Figure 1:
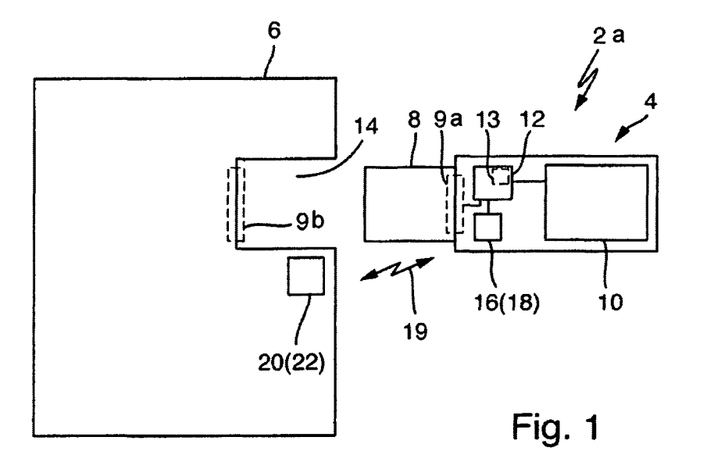
FIGS. 1 to 3 illustrate a medical system with a removable data storage medium and a medical device, each in a schematic representation and according to different exemplary embodiments.

FIG. 1 shows in a schematic representation a medical system 2a, comprising a removable data storage medium 4 and a medical device 6.

The removable data storage medium 4 comprises a serial interface 9a, such as a USB port, which is provided within the USB plug 8. Moreover, the removable data storage medium 4 comprises a non-volatile storage medium 10, for example a flash memory, like an EEPROM. A memory controller 12, which controls the data transmission between the serial interface 9a and the non-volatile storage medium 10, is located between the non-volatile storage medium 10 and the serial interface 9a present within the USB plug 8. The non-volatile storage medium 10, the memory controller 12 and the serial interface 9a are interconnected through suitable data lines. This is shown schematically in FIG. 1 by lines.

The USB plug 8, such as a standard USB plug, represents the physical interface of the removable data storage medium 4 to a host computer, such as a medical device 6. For the data communication with the removable data storage medium 4, the medical device 6 comprises a corresponding USB socket 14.

The medical device 6 is, for example, a video management control unit, which is used in a medical environment, such as in an intensive care environment, such as for example an operating theater or room. The medical device 6 can also be any other medical device, for example a therapeutic or diagnostic device, which serves to generate image data, which can be queried via an internal serial interface 9b connected to the USB socket 14. For this purpose, the medical device 6 comprises the further components necessary, which are not shown in FIG. 1. The above explanations also apply to the following exemplary embodiments.

The removable data storage medium 4 also comprises further components not shown in FIG. 1, which are only left out for reasons of simplification. For example, the removable data storage medium 4 comprises an oscillator, a LED indicating the operating state and a printed circuit board, which receives the non-volatile storage medium, the memory controller and the other named electronic components. These explanations also apply to all exemplary embodiments.

The removable data storage medium 4 comprises a receiving unit 16, which is configured to receive a device identification feature of the medical device 6 that can be connected to the removable data storage medium 4. For this purpose, the receiving unit 16 is configured to receive data via a wireless data link 19. According to the exemplary embodiment shown in FIG. 1, the receiving unit 16 is an RFID transponder 18. The receiving unit 16 of the removable data storage medium 4 communicates with a transmitting unit 20 of the medical device 6 via the wireless data link 19. In the shown exemplary embodiment, the transmitting unit 20 of the medical device 6 is an RFID tag 22.

The RFID tag 22 comprises a device identification feature in the form of a code identifying the medical device 6. This can be stored in the RFID tag 22. The code identifying the medical device 6 can be for example a serial number, a type designation, a manufacturer designation, a manufacturer identification number, a manufacturer code, a hardware or software configuration, a version number, etc.

In that the removable data storage medium 4 reads the device identification feature of the medical device 6 using the RFID transponder 18, the removable data storage medium 4 is enabled to compare this device identification feature, for example a manufacturer designation or a serial number, with a predetermined internal criterion. For this purpose, the removable data storage medium 4 comprises a write protection unit 13.

The write protection unit 13 can be implemented both as hardware and software. The write protection unit 13 can be implemented as part of the memory controller 12.

The write protection unit 13 determines whether or not the queried device identification feature of the medical device 6 complies with the internal criterion of the removable data storage medium 4. In other words, the removable data storage medium 4 determines whether or not the medical device 6 is qualified. The removable data storage medium 4 ensures full access (i.e. read and write access) to the non-volatile memory 10 for qualified medical devices 6, while non-qualified appliances 6 are only granted read access to the non-volatile storage medium 10.

The internal criterion is, for example, a criterion to be clearly met. In other words, the data storage medium 4 is configured to only communicate with medical devices 6 from a certain manufacturer or with medical devices 6 of a certain series.

According to a further exemplary embodiment, the write protection unit 13 defines the criterion such that a minimum requirement must be met in order to ensure read and write access. For example, a minimum hardware or software version, version number, appliance number, year of manufacture, etc. may need to be met.

It is also possible that an internal list of potential criteria that may need to be cumulatively met is present in the removable data storage medium 4 so that the device identification feature also complies with the predetermined internal criterion when one or more of the queried criteria, for example a manufacturer designation and/or a serial number, greater than a predetermined value and/or a predetermined minimum are met. Even a minimum satisfied safety standard of the medical device 6 can be used as the device identification feature.

If the medical device 6 complied with the predetermined internal criterion of the removable data storage medium 4, then the write protection unit 13 grants the medical device 6 read and write access to the non-volatile storage medium 10. In all other cases, i.e. when the device identification feature does not comply with the predetermined internal criterion or no device identification feature can be identified, the write protection unit 13 exclusively ensures read access to the non-volatile storage medium 10. This is, for example, the case when an arbitrary computer system is connected to the serial interface 9a of the removable data storage medium 4.

The described allocation of the access rights to the non-volatile storage medium 10 of the removable data storage medium 4 prevents data from any computer system from making its way onto different medical devices via the removable data storage medium 4, which serves as a transport medium. Thus, the spread of malware on medical devices 6 can be avoided.

Figure 2:
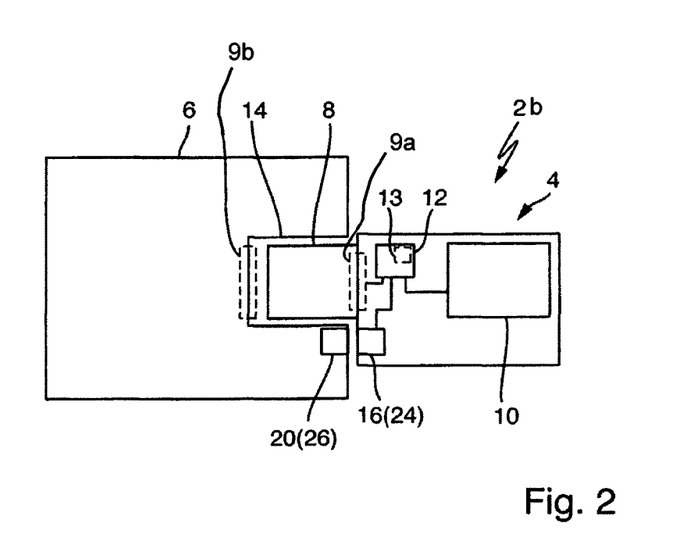

FIG. 2 shows a further schematically drawn medical system 2b according to a further exemplary embodiment. In contrast to the medical system 2a shown in FIG. 1, the removable data storage medium 4 with its USB plug 8 is plugged into the USB socket 14 of the medical device 6.

For transmitting data from the medical device 6 to the removable data storage medium 4, the serial interface 9a, thus the USB port of the removable data storage medium 4, is connected to the corresponding serial interface 9b of the medical device 6, for example thus the USB plug 8 is plugged into the USB socket 14 of the medical device 6. The removable data storage medium 4 subsequently receives an application identification feature from the connected medical device 6 on its receiving unit 16.

In the exemplary embodiment shown in FIG. 2, the transmission of the device identification feature from the medical device 6 to the removable data storage medium 4 takes place with the help of an optical data link. For this purpose, the removable data storage medium 4 comprises a photodiode 24. It receives the signals of a light emitter, such as an infrared light-emitting diode 26, which is integrated into the medical device 6 as a transmitting unit 20.

After receiving the device identification feature, the write protection unit 13 of the removable data storage medium 4 compares the received device identification feature with an internal criterion. Read/write access to the non-volatile storage medium 10 is subsequently established if the device identification feature of the medical device 6 complies with the criterion. If this is not the case, then the access to the non-volatile storage medium 10 is restricted to read access only.

Further details regarding the functionality of the removable data storage medium 4 and of the medical device 6 were already explained when making reference to the exemplary embodiment shown in FIG. 1.

For transmitting the device identification feature, the infrared light-emitting diode 26 and the photodiode 24 of the medical device 6 and of the removable data storage medium 4, respectively, are arranged opposite each other. This is applicable when the removable data storage medium 4 is connected to the medical device 6 (as shown schematically in FIG. 2). The transmitting unit 20 and the receiving unit 16 of the medical device 6 of the removable data storage medium 4 can lie opposite each other when the USB plug 8 of the removable data storage medium 4 is plugged into the USB socket 14 of the medical device 6. According to a further exemplary embodiment (not shown), the transmitting unit 20 and the receiving unit 16 are directly integrated into a specially shaped USB plug 6 and USB socket 14, respectively.

Figure 3:
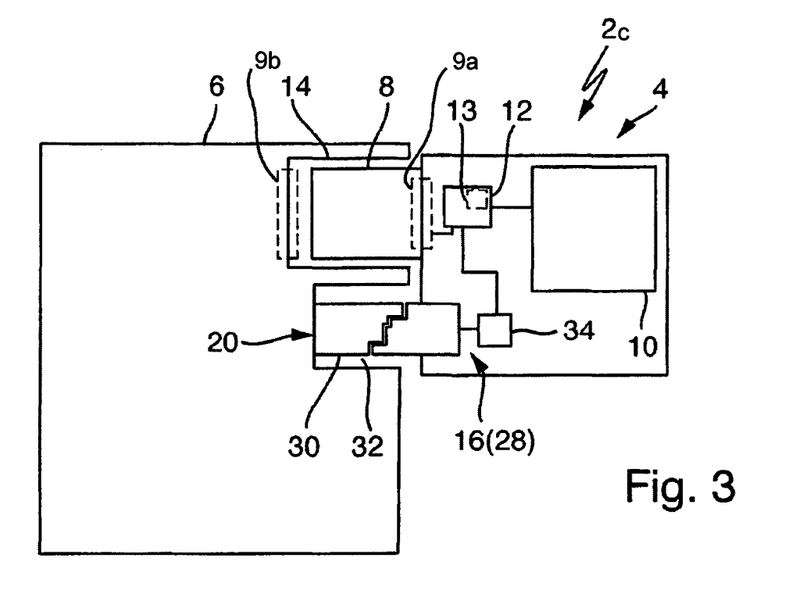

FIG. 3 shows a further medical system 2c in a schematic representation. The removable data storage medium 4 already described in detail in connection with FIGS. 1 and 2 and the medical device 6 are equipped with a transmitting and receiving unit 20, 16, respectively, in the shown exemplary embodiment, which is mechanically encoded.

The transmitting unit 20 and the receiving unit 16 are encoded complementary mechanically and interact similar to a key-and-lock principle. For example, the removable data storage medium 4 is provided with a pin 28 of a certain length. It works together with an additional pin 30, which is located in a medical device 6. If both pins 28, 30 have a suitable length, in other words if they add up to a predetermined length, then a position sensor 34 present within the removable data storage medium 4 (not shown in greater detail in FIG. 3), for example a micro switch, is activated, the switch position of which specifies that the medical device 6 is a qualified medical device 6. If the lengths of both pins 28, 30 are not coordinated, then there is no release.

According to a further exemplary embodiment, the pin 28 present on the removable data storage medium 4 is provided with a characteristic shape on its tip facing the medical device 6. In interaction with a complementary counter shape, which is located on the additional pin 30, which is connected to the medical device 6, the suitable length of both pins 28, 30 is configured in that the position sensor 34 is reactivated.

For example, if the mechanically encoded shape of the pin 28 does not fit the counter shape of the additional pin 30, then it enters too deeply or not deeply enough into the recess 32 present in the medical device 6 and the position sensor 34 is not activated.

The pin 28 present on the removable data storage medium 4 forms a mechanical receiving unit 16 to this effect, and the additional pin 30 present on the medical device 6 also forms a mechanical transmitting unit 20 to this effect. Only if the pin 28 is located in the correct position when the removable data storage medium 4 is plugged in is full access (read and write access) to the non-volatile storage medium 10 granted by the write protection unit 13 present in the memory controller 12.

Figure 4:
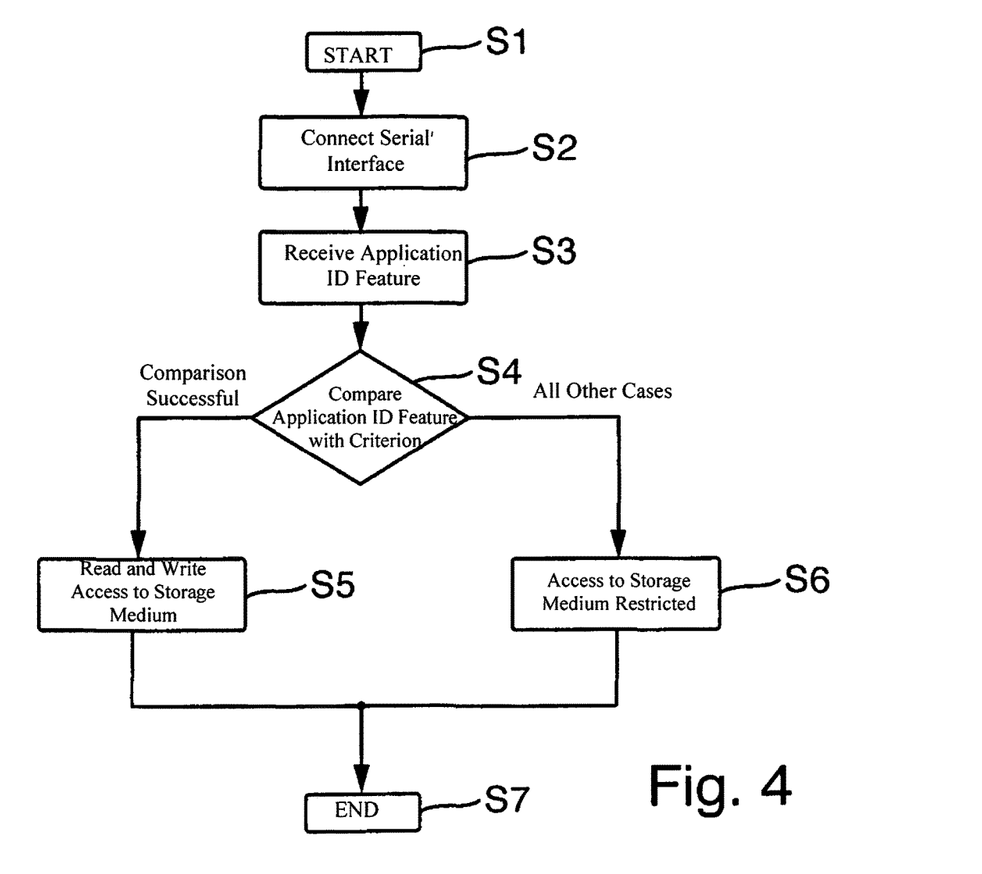
FIG. 4 illustrates a schematic flow diagram of a method for operating a removable data storage medium, according to an exemplary embodiment.

FIG. 4 shows a schematic flow chart of a method for operating a removable data storage medium 4. The method starts in step S1. The serial interface 9a of the removable data storage medium 4 is subsequently connected to the serial interface 9b of the medical device 6 (step S2). The removable data storage medium 4 subsequently receives an application identification feature from the connected medical device 6 on the receiving unit 16 (step S3). The steps S2 and S3 do not need to be performed in the sequence shown in FIG. 3. According to a further exemplary embodiment, it is also possible that the application identification feature is received before the serial interfaces 9a, 9b of the removable data storage medium 4 and of the medical device 6 are interconnected. This case is possible when the device identification feature is transmitted via a wireless data link 19.

The device identification feature is subsequently compared with a predetermined internal criterion (step S4). If this comparison is successful, then read and write access to the non-volatile storage medium 10 of the removable data storage medium 4 is set up (step S5). In all other cases, i.e. if the device identification feature does not comply with the predetermined criterion or a device identification feature cannot be identified, access to the non-volatile storage medium 10 is restricted to read access (step S6). The method finally ends in step S7.

Figure 5A:
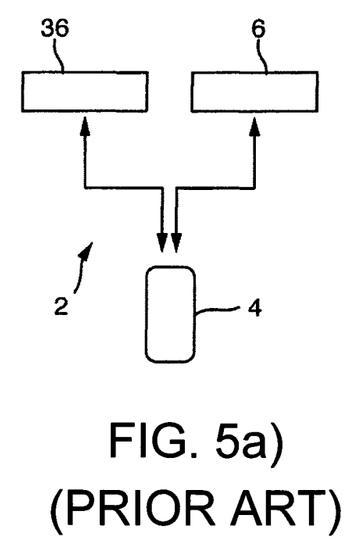
FIG. 5a illustrates a schematically shown communication schema in a medical system, comprising a removable data storage medium according to the prior art and FIG. 5b illustrate a schematically drawn communication schema in a medical system, comprising a removable data storage medium according to one exemplary embodiment.

FIG. 5a schematically shows the communication of a removable data storage medium 4 according to the prior art with any computer system 36 on one side and with a medical device in a medical system 2 on the other side. The double arrow shown in FIG. 5a between the removable data storage medium 4 and the computer system 36 indicates full access to the removable data storage medium 4, i.e. read and write access to its non-volatile storage medium 10. The removable data storage medium 4 also communicates with the medical device 6 with full access. As can be seen in FIG. 5a, malware from the computer system 36 can get into the medical device 6.

Figure 5B:
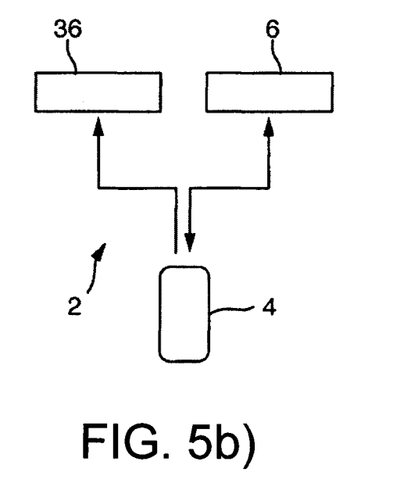

In contrast, as shown schematically in FIG. 5b, access from any computer system 36 to a removable data storage medium 4 according to an exemplary embodiment of the invention is restricted to read access. This is indicated by the arrow pointing from the removable data storage medium 4 in the direction of the computer system 36. Data transmission in the opposite direction, i.e. from the computer system 36 to the removable data storage medium 4, is not possible. Only in communication with a qualified medical device 6, which is qualified based on its device identification feature, which complies with the predetermined internal criterion of the removable data storage medium 4, full access indicated by a double arrow (read and write access) is possible.

Thus, communication between respectively qualified medical devices 6 is possible with the help of the removable data storage medium 4 without restrictions. At the same time, the data security in this internal system compared to known solutions is considerably increased.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

REFERENCE LIST 2a, 2b, 2c Medical system
4 Removable data storage medium
6 Medical device
8 USB plug
9a, 9b Serial interface
10 Non-volatile storage medium
12 Memory controller
13 Write protection unit
14 USB socket
16 Receiving unit
18 RFID transponder
19 Wireless data link
20 Transmitting unit
22 RFID tag
24 Photodiode
26 Infrared light-emitting diode
28 Pin
30 Additional pin
32 Recess
34 Position sensor
36 Computer system

What is claimed is:

1. A medical system comprising:
a removable data storage medium that comprises:
a serial interface;
a non-volatile storage medium;
a memory controller, and
a mechanically encoded receiver;
a medical device that can be connected to the removable data storage medium, the medical device comprises a device identification feature that identifies the medical device, and the medical device comprises a mechanically encoded transmitter complementary with the mechanically encoded receiver of the removable data storage medium;
the memory controller of the removable data storage medium is configured to control data transmission between the serial interface and the non-volatile storage medium;
the mechanically encoded receiver of the removable data storage medium is configured to receive a device identification feature from the medical device that can be connected to the removable data storage medium, wherein the device identification feature identifies the medical device, and the device identification feature is received by mechanical interaction with the mechanically encoded transmitter of the medical device;
the memory controller of the removable data storage medium is configured to:
compare the device identification feature with a predetermined internal criterion, wherein:
if the device identification feature complies with the predetermined internal criterion, permits read and write access from the medical device to the non-volatile storage medium and,
if the device identification feature does not comply with the predetermined internal criterion, limits the write access of the medical device to the non-volatile storage medium and maintain the read access of the medical device to the non-volatile storage medium.

2. The medical system of claim 1, wherein the removable data storage medium is a USB memory stick, which comprises a USB port as the serial interface.

3. The medical system of claim 1, wherein the medical device further comprises:
a serial interface for exchanging data with the removable data storage medium.

4. The medical system of claim 1, wherein the removable data storage medium comprises:

wherein the memory controller is configured to control data transmission between the serial interface and the non-volatile storage medium;
a write protection unit;
wherein the receiver is configured to receive the device identification feature from a particular medical device; and
the write protection unit is configured to compare the received device identification feature with the predetermined internal criterion.

5. The medical system of claim 4, wherein the write protection unit is provided in the memory controller.

6. A method for operating a removable data storage medium having a serial interface, a non-volatile storage medium and a memory controller controlling data transmission between the serial interface and the non-volatile storage medium, wherein the removable storage medium further having a write protection unit and a receiver, the method comprising:
connecting the serial interface of the removable data storage medium with a serial interface of a medical device;
receiving a device identification feature from the medical device on the receiver, wherein the device identification feature identifies the medical device;
comparing the device identification feature with a predetermined internal criterion; and
setting read and write access to the non-volatile storage medium of the removable data storage medium if the device identification feature complies with the criterion;
restricting the write access of the medical device to the non-volatile storage medium and maintaining the read access of the medical device to the non-volatile storage medium if the device identification feature does not comply with the criterion; and
wherein the receiver is a mechanically encoded receiver, and the device identification feature is received at the receiver by mechanical interaction with a complementary mechanically encoded transmitter.

* * * * *